US012703440B2

(12) United States Patent
Nastov et al.

(10) Patent No.: US 12,703,440 B2
(45) Date of Patent: Aug. 11, 2026

(54) VEHICLE INCLUDING AERODYNAMIC DEVICE CONTROL AND SYSTEM

(71) Applicant: GM Global Technology Operations LLC, Detroit, MI (US)

(72) Inventors: Alexander N. Nastov, Farmington Hills, MI (US); Carlos Martinez, LaSalle (CA); Abdulrahman Al-Shanoon, Toronto (CA)

(73) Assignee: GM Global Technology Operations LLC, Detroit, MI (US)

( * ) Notice: Subject to any disclaimer, the term of this patent is extended or adjusted under 35 U.S.C. 154(b) by 387 days.

(21) Appl. No.: 18/487,494

(22) Filed: Oct. 16, 2023

(65) Prior Publication Data

US 2025/0121893 A1 Apr. 17, 2025

(51) Int. Cl.
*B62D 35/00* (2006.01)
*B62D 35/02* (2006.01)

(52) U.S. Cl.
CPC .......... *B62D 35/007* (2013.01); *B62D 35/02* (2013.01)

(58) Field of Classification Search
CPC .............................. B62D 35/02; B62D 35/007
See application file for complete search history.

(56) References Cited

U.S. PATENT DOCUMENTS

| | | | | |
|---|---|---|---|---|
| 2002/0093220 A1* | 7/2002 | Borghi | ................ | B62D 35/007 296/180.5 |
| 2017/0088194 A1* | 3/2017 | Heil | ....................... | B62D 35/00 |
| 2019/0054962 A1* | 2/2019 | Potvin | .................. | B62D 35/007 |
| 2019/0111979 A1* | 4/2019 | Demetrio | ............ | B62D 35/007 |
| 2024/0359752 A1* | 10/2024 | Onishi | ................ | B62D 35/007 |

FOREIGN PATENT DOCUMENTS

DE 102021101716 A1 8/2021

* cited by examiner

*Primary Examiner* — Dany E Akakpo
(74) *Attorney, Agent, or Firm* — Honigman LLP; Matthew H. Szalach

(57) ABSTRACT

A vehicle including a first aerodynamic device extending from a body of the vehicle and movable between an extended position and a retracted position and an aerodynamic control module configured to determine wind conditions during forward movement of the vehicle and to move the first aerodynamic device between the extended position and the retracted position based on the determined wind conditions.

19 Claims, 4 Drawing Sheets

10
18
20
22
24
44
46

10
16
32
34
44
28
30

VEHICLE INCLUDING AERODYNAMIC DEVICE CONTROL AND SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to vehicle aerodynamic devices and, more particularly, to controlling vehicle aerodynamic devices based on wind conditions.

Vehicles are designed to minimize drag during operation in an effort to increase the overall efficiency of the vehicle. For example, vehicle bodies typically employ rounded and sculpted surfaces to not only provide the vehicle with an aesthetically pleasing appearance but, more importantly, to provide the vehicle with the ability to push air aside during forward movement of the vehicle through the air. In so doing, the amount of energy required to move the vehicle through the air is reduced which, in turn, increases the overall efficiency of the vehicle. In the context of a vehicle powered by an internal combustion engine (ICE), improving the efficiency of the vehicle results in the vehicle consuming less fuel over a given distance. In the case of an electric vehicle (EV), improving the efficiency of the vehicle allows the vehicle to have a greater range on a given charge. In short, optimizing the aerodynamics of a vehicle allows the vehicle to operate efficiently by using less fuel in the case of an ICE vehicle and by using less electricity in the case of an EV.

The aerodynamics of the vehicle body may be enhanced by providing the vehicle body with an aerodynamic device such as a spoiler. A spoiler may be mounted on or proximate to an edge of a vehicle trunk, deck lid, or liftgate to "spoil" unfavorable air flow across the vehicle body when in motion. As such, the spoiler reduces the drag of the vehicle and increases the vehicle's overall efficiency.

While the overall shape of a vehicle body impacts the drag experienced by the vehicle during use, certain structures of the vehicle are difficult to optimize and inherently include a substantially flat surface that engages the air during forward movement of the vehicle. Such surfaces increase the drag of the vehicle during forward movement of the vehicle which, in turn, reduces the efficiency of the vehicle. For example, a ground-engaging surface of a vehicle tire typically includes a series of grooves, channels, and ridges formed into a substantially flat surface of the tire. The grooves, channels, and ridges—along with the substantially flat surface of the tire—oppose the air during forward movement of the vehicle and, as such, increase the drag of the vehicle.

In order to minimize the effects of the tires on the overall drag of the vehicle, an aerodynamic device may be used to shield a portion of the substantially flat surface of the tire from the air during forward movement of the vehicle. For example, a series of tire deflectors may depend from a vehicle body and cover a portion of the substantially flat portion of the ground-engaging surface of each tire. While the tire deflectors likewise face the air during forward movement of the vehicle, an outer surface of the tire deflector is typically curved to push or move air to the side of the vehicle during forward movement of the vehicle. Accordingly, employing tire deflectors improves the overall aerodynamics of the vehicle.

While conventional aerodynamic devices such as spoilers and tire deflectors improve the aerodynamics of a vehicle and lead to more efficient operation of the vehicle, such aerodynamic devices are typically static and are designed and optimized for a single, headwind condition. Accordingly, conventional aerodynamic devices are not optimized for crosswinds experienced by the vehicle during forward movement of the vehicle.

SUMMARY

In one configuration, a vehicle is provided and includes a first aerodynamic device extending from a body of the vehicle and movable between an extended position and a retracted position and an aerodynamic control module configured to determine wind conditions during forward movement of the vehicle and to move the first aerodynamic device between the extended position and the retracted position based on the determined wind conditions.

The vehicle may include one or more of the following optional features. For example, the first aerodynamic device may be a tire deflector. Alternatively, the first aerodynamic device may be a spoiler.

A second aerodynamic device may extend from the body of the vehicle and may be movable between an extended position and a retracted position. The second aerodynamic device may be operable between the extended position and the retracted position independent of the first aerodynamic device. Further, the aerodynamic control module may be configured to move the second aerodynamic device between the extended position and the retracted position based on the determined wind conditions.

In one configuration, the first aerodynamic device may be movable into a plurality of positions relative to the body between the extended position and the retracted position.

In another configuration, a vehicle is provided and includes a first tire deflector extending from a body of the vehicle proximate to a first tire located on a driver side of the vehicle and movable between an extended position and a retracted position and a second tire deflector extending from the body of the vehicle proximate to a second tire located on a passenger side of the vehicle and movable between an extended position and a retracted position. An aerodynamic control module is configured to move the first tire deflector and the second tire deflector into the extended position during a headwind condition and to move one of the first tire deflector and the second tire deflector into the extended position and the other of the first tire deflector and the second tire deflector into the retracted position in a crosswind condition.

The vehicle may include one or more of the following optional features. For example, at least one sensor may be operable to detect wind conditions proximate to the vehicle during forward movement of the vehicle. In one configuration, the at least one sensor may be at least one of a radar sensor and an ultrasonic sensor. Additionally or alternatively, the at least one sensor may be in communication with the aerodynamic control module, the aerodynamic control module configured to differentiate between the headwind condition and the crosswind condition based on information received from the at least one sensor.

A spoiler may extend from the body of the vehicle and may include a first end and a second end. In this configuration, the aerodynamic control module may be configured to move the first end and the second end between a first position extending from a surface of the body and a second position adjacent to the surface of the body. The aerodynamic control module may be configured to move the first end and the second end independently from one another. Additionally or alternatively, the aerodynamic control module may be configured to move the first end and the second end between the first position and the second position based on the vehicle experiencing the headwind condition or the crosswind condition.

In yet another configuration, a system is provided and includes data processing hardware and memory hardware in communication with the data processing hardware, the memory hardware storing instructions that when executed on the data processing hardware cause the data processing hardware to perform operations including (i) determining wind conditions during forward movement of a vehicle and (ii) adjusting at least one aerodynamic device based on the determined wind conditions.

The system may include one or more of the following optional features. For example, the at least one aerodynamic device may include a tire deflector. Alternatively, the at least one aerodynamic device may include a spoiler. The tire deflector and the spoiler may be moved between an extended position extending from a body of the vehicle and a retracted position based on the determined wind conditions.

A vehicle may incorporate the system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
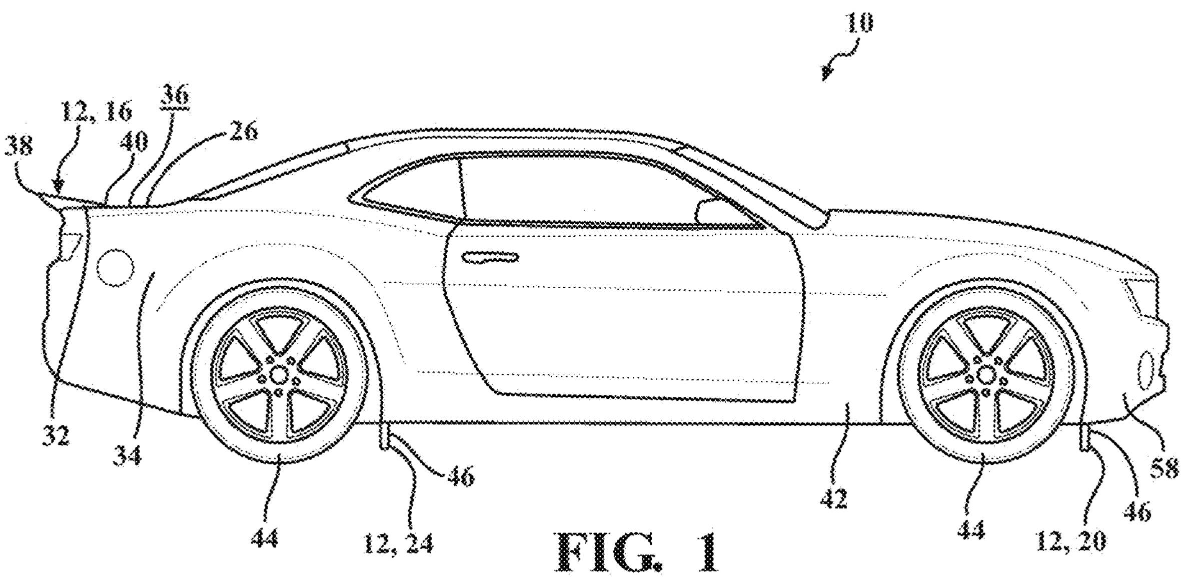
FIG. 1 is a side view of a vehicle incorporating example aerodynamic devices according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

With reference to the figures, a vehicle 10 is provided and includes a series of aerodynamic devices 12 and an aerodynamic control module 14. The aerodynamic devices 12 are located at various locations of the vehicle 10 to improve the aerodynamics of the vehicle 10 during forward movement of the vehicle 10. The aerodynamic control module 14 is in communication with the aerodynamic devices 12 and selectively adjusts a position of one or more of the aerodynamic devices 12 based on current wind conditions around the vehicle 10 in an effort to optimize the effectiveness of the aerodynamic devices 12. In so doing, the aerodynamic control module 14 optimizes the overall aerodynamics of the vehicle 10 and, thus, increases the efficiency of the vehicle 10 during operation.

The vehicle 10 may be powered by an internal combustion engine (ICE). Alternatively, the vehicle 10 may be an electric vehicle (EV) that is powered by one or more electric motors. Finally, the vehicle 10 may be a hybrid-electric vehicle (HEV) that includes an ICE and one or more electric motors that cooperate to power the vehicle 10 or may include a fuel cell that powers the vehicle 10. In the case of an ICE and an HEV vehicle, optimization of the overall aerodynamics of the vehicle 10 increases the efficiency of the vehicle 10 by reducing the amount of fuel required to move the vehicle 10 a given distance. In the case of an EV and an HEV vehicle, optimization of the overall aerodynamics of the vehicle 10 increases the efficiency of the vehicle 10 by reducing the amount of energy required to move the vehicle 10 a given distance.

With reference to FIG. 1, the aerodynamic devices 12 are shown as including a spoiler 16, a front, driver-side (FDS) tire deflector 18, a front, passenger-side (FPS) tire deflector 20, a rear, driver-side (RDS) tire deflector 22, and a rear, passenger-side (RPS) tire deflector 24. The foregoing elements are examples of aerodynamic devices 12 that could be implemented on the vehicle 10 and controlled by the aerodynamic control module 14. Other aerodynamic devices 12 could include any active aerodynamic device that controls separation of airflow around, through, or off a body of the vehicle 10 such as, for example, body appliques located on one or more pillars of the vehicle 10. Further, while the aerodynamic devices 12 are shown in conjunction with a car, the aerodynamic devices 12 could be used in conjunction with any vehicle such as, for example, pickup trucks, sport utility vehicles (SUV), vans, and freight trucks.

The spoiler 16 is located proximate to a posterior end of the vehicle 10 and is mounted to a trunk 26 of the vehicle 10. The spoiler 16 extends from a first end 28 located on a driver side 30 of the vehicle 10 to a second end 32 located on a passenger side 34 of the vehicle 10. As shown, the spoiler 16 extends in a direction away from a top surface 36 of the trunk 26 to an edge 38. In one configuration, the spoiler 16 includes a substantially constant slope from a junction 40 of the spoiler and the top surface 36 of the trunk 26 to the edge 38.

Each of the FDS tire deflector 18, the FPS tire deflector 20, the RDS tire deflector 22, and the RPS tire deflector 24 extends from a body 42 of the vehicle 10 in a direction toward a ground surface, as shown in FIG. 1. As shown, the tire deflectors 18, 20, 22, 24 extend from the body 42 of the vehicle in front of a tire 44 of the vehicle 10 such that each tire deflector 18, 20, 22, 24 extends between a respective tire 44 and an anterior end of the vehicle 10. As such, the tire deflectors 18, 20, 22, 24 serve to direct air passing over an area of the tires 44 away from each tire 44 to improve the aerodynamics of the vehicle 10. In one configuration, each tire deflector 18, 20, 22, 24 includes a rounded and/or sculpted leading surface 46 (FIG. 1) that interacts with the air as the vehicle 10 moves in a forward direction.

The spoiler 16 and each of the tire deflectors 18, 20, 22, 24 may be moved relative to the vehicle body 42 based on current wind conditions. Namely, the spoiler and/or tire deflectors 18, 20, 22, 24 may be adjusted by the aerodynamic control module 14 based on whether the vehicle 10 is experiencing a headwind (FIGS. 3A, 4A) or a crosswind (FIGS. 3B, 3C, 4B, 4C). Further, and with respect to a crosswind, the spoiler and/or the tire deflectors 18, 20, 22, 24 may be adjusted by the aerodynamic control module 14 based on the direction of the crosswind in an effort to optimize the aerodynamics of the vehicle 10, as will be described in greater detail below.

Figure 2:
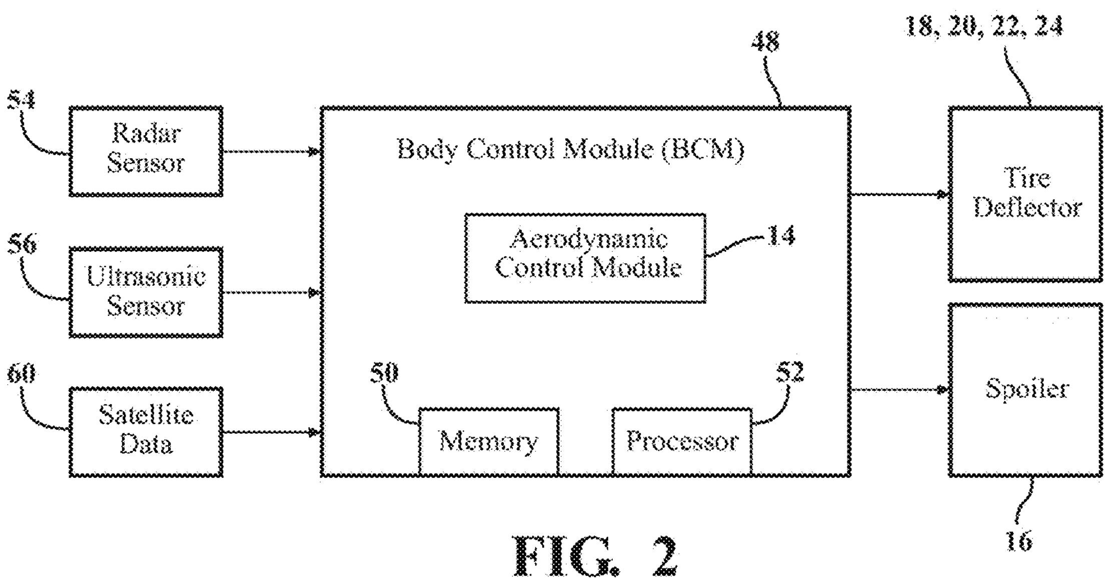
FIG. 2 is a schematic representation of a system for controlling the aerodynamic devices of FIG. 1.

The aerodynamic control module 14 may be executed by a body control module (BCM) 48 of the vehicle 10. As shown in FIG. 2, the BCM 48 may include a memory 50 and a processor 52 that cooperate to store and execute the aerodynamic control module 14. Specifically, the memory 50 may store instructions, rules, and algorithms for the aerodynamic control module 14, which may be executed by the processor 52. It should be noted that while the aerodynamic control module 14 is described and shown as being stored and executed by the BCM 48, the aerodynamic control module 14 could be a standalone controller or could be incorporated into another controller associated with the vehicle 10. For example, the aerodynamic control module 14 could be stored and executed by a chassis control module (not shown).

As shown in FIG. 2, the aerodynamic control module 14 is in communication with various sensors to allow the aerodynamic control module 14 to determine current wind conditions. For example, the aerodynamic control module 14 may receive information from a radar sensor 54 and/or an ultrasonic sensor 56 for use by the aerodynamic control module 14 in determining the current wind conditions experienced by the vehicle 10. For example, the aerodynamic control module 14 may receive information from the radar sensor 54 and/or the ultrasonic sensor 56 to determine whether the vehicle 10 is experiencing a headwind or a crosswind and, if experiencing a crosswind, the direction of the crosswind. The radar sensor 54 and/or the ultrasonic sensor 56 may be a dual-purpose sensor that the aerodynamic control module 14 utilizes to determine the current wind experienced by the vehicle 10. For example, the ultrasonic sensor(s) 56 may be located in a front fascia 58 of the vehicle 10 for use by the BCM 48 or other vehicle controller as a proximity sensor. Accordingly, the ultrasonic sensor(s) 56 may serve a dual purpose by not only proving the BCM 48 or other vehicle controller with proximity data (i.e., how close the vehicle 10 is located to an external structure or another vehicle) but also provides the BCM 48 with data for use by the aerodynamic control module 14 in determining the current wind conditions experienced by the vehicle 10. In so doing, the costs associated with determining the current wind conditions are negligible, as the aerodynamic control module 14 is utilizing already existing sensors.

The aerodynamic control module 14 may also receive satellite data 60 regarding current weather and/or wind conditions. The satellite data 60 may be used by the aerodynamic control module 14 to confirm the current wind conditions determined based on information from the various sensors 54, 56. For example, global positioning data (GPS) may be used by the BCM 48 to determine the current location of the vehicle 10. The location of the vehicle 10 can then be used by the BCM 48 to retrieve the current weather and/or wind conditions from the satellite 60. While the BCM 48 is described and shown as receiving satellite data 60, the BCM 48 could additionally or alternatively be in communication with a mobile device associated with a vehicle owner or occupant such as a cellular telephone or tablet.

Such a mobile device can likewise provide the BCM 48 with weather and/or wind data based on the current location of the vehicle 10.

Figures 3A, 3B, 3C:
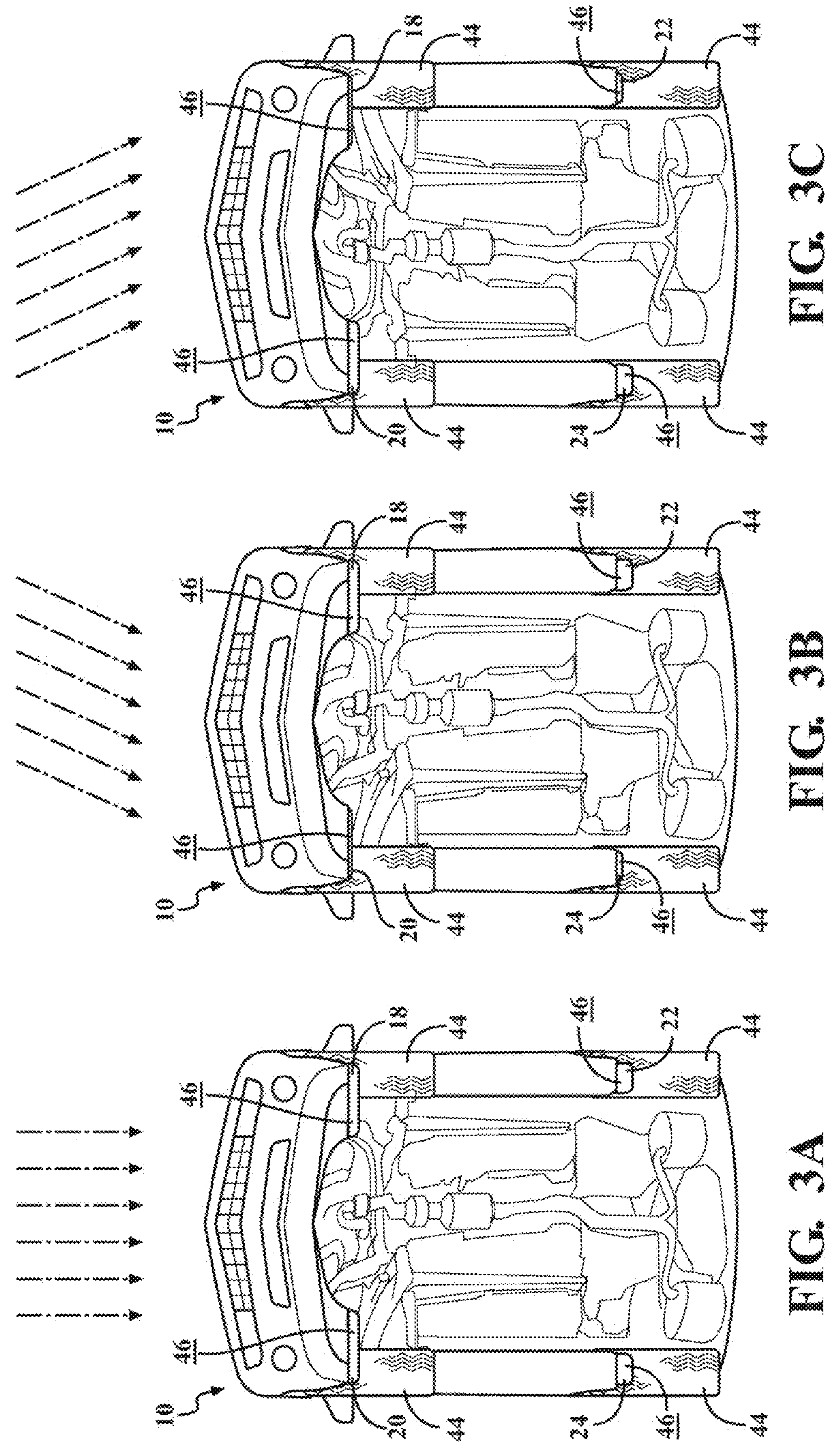
FIG. 3A is a bottom view of the vehicle of FIG. 1 in a headwind condition and tire deflectors of the aerodynamic devices in a headwind-responsive position.
FIG. 3B is a bottom view of the vehicle of FIG. 1 in a first crosswind condition and tire deflectors of the aerodynamic devices in a first crosswind-responsive position.
FIG. 3C is a bottom view of the vehicle of FIG. 1 in a second crosswind condition and tire deflectors of the aerodynamic devices in a second crosswind-responsive position.
Figures 4A, 4B, 4C:
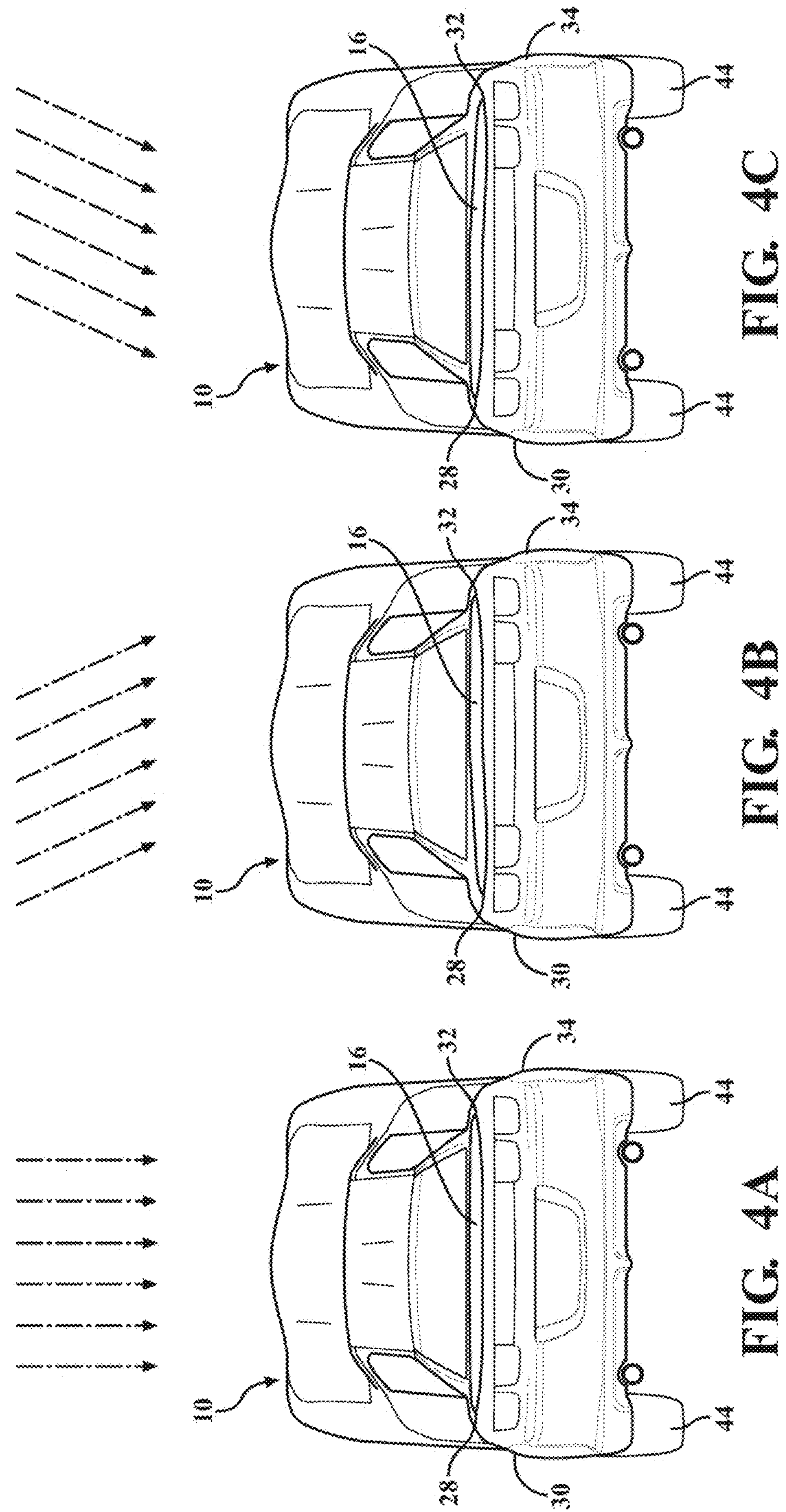
FIG. 4A is a rear view of the vehicle of FIG. 1 in a headwind condition and a spoiler of the aerodynamic devices in a headwind-responsive position.
FIG. 4B is a rear view of the vehicle of FIG. 1 in a first crosswind condition and a spoiler of the aerodynamic devices in a first crosswind-responsive position.
FIG. 4C is a rear view of the vehicle of FIG. 1 in a second crosswind condition and a spoiler of the aerodynamic devices in a second crosswind-responsive position.

In operation, when the vehicle 10 experiences a headwind (FIGS. 3A, 4A), the aerodynamic control module 14 extends each of the tire deflectors 18, 20, 22, 24 from the vehicle body 42 and positions the first end 28 and the second end 32 of the spoiler 16 the same distance from the surface 36 of the trunk 26. In this position, each of the aerodynamic devices 12 is in a position to maximize the aerodynamics of the vehicle 10, thereby increasing the efficiency of the vehicle 10. Specifically, and in the case of the tire deflectors 18, 20, 22, 24, when the vehicle 10 experiences a headwind, air flows in a direction, as shown in FIGS. 3A, 4A and confronts a substantially flat surface of each tire 44, thereby increasing the drag of the vehicle 10. When the tire deflectors 18, 20, 22, 24 are extended from the vehicle body 42, each tire deflector 18, 20, 22, 24 covers the substantially flat surface of each tire 44 with the curved, leading surface 46 of each deflector 18, 20, 22, 24. In so doing, the tire deflectors 18, 20, 22, 24 serve to direct the air from the headwind to the sides of the vehicle 10 and away from the tires 44. The tire deflectors 18, 20, 22, 24 may be moved between a retracted position and a fully extended position. Further, the tire deflectors 18, 20, 22, 24 may be moved into a plurality of partially extended positions between the retracted position and the fully extended position. The position of the tire deflectors 18, 20, 22, 24 and, more particularly, the extent to which the tire deflectors 18, 20, 22, 24 are extended from the vehicle 10 between the retracted position and the fully extended position, is determined by the aerodynamic control module 14 based on current wind direction and/or magnitude.

The spoiler 16 does not function to redirect the wind from the headwind but, rather, serves to "spoil" the flow of the headwind over the vehicle body 42. In a headwind condition, the airflow extends substantially equally over the vehicle body 42 from the driver side 30 to the passenger side 34. Accordingly, the aerodynamic control module 14 positions the spoiler 16 such that the first end 28 and the second end 32 are substantially equidistant from the surface 36 of the trunk 26 to allow the full length of the spoiler 16 to interact with the headwind flowing over the vehicle body 42. The spoiler 16 may be moved into a plurality of positions or heights relative to the surface 36 of the trunk 26. As with control of the tire deflectors 18, 20, 22, 24, the aerodynamic control module 14 will control a height of the spoiler 16 based on current wind direction and/or magnitude.

If the aerodynamic control module 14 detects a crosswind based on data from the radar sensor 54, ultrasonic sensor 56, and/or satellite data 60, the aerodynamic control module 14 will adjust a position of one or more of the tire deflectors 18, 20, 22, 24 and the spoiler 16. For example, if the crosswind is determined to be applied to the vehicle 10 at the driver side 30 (FIGS. 3B, 4B), the aerodynamic control module 14 will extend the tire deflectors 18, 22 located on the driver side 30 and will retract the tire deflectors 20, 24 located on the passenger side 34. In so doing, the tire deflectors 18, 22 on the driver side 30 interact with the crosswind to optimize the aerodynamics of the vehicle 10 by diverting the crosswind away from the tires 44. Further, by retracting the tire deflectors 22, 24 associated with the passenger side 34, the drag associated with the unused tire deflectors 22, 24 is not realized and the overall aerodynamics of the vehicle 10 are improved. Specifically, if the tire deflectors 22, 24 associated with the passenger side 34 are not receiving the current wind due to the wind being a crosswind from the driver side 30, retracting the tire deflectors 22, 24 associated with the passenger side 34 will prevent the tire deflectors 22, 24 from adding to the drag of the forward-moving vehicle 10.

In addition to adjustment of the tire deflectors, 18, 20, 22, 24, the aerodynamic control module 14 will also adjust a position of the spoiler 16. Specifically, when a crosswind is determined at the driver side 30 (FIGS. 3B, 4B), the aerodynamic control module 14 will raise the first end 28 of the spoiler 16 away from the surface 36 of the trunk 26 and/or will lower the second end 32 such that the second end 32 is disposed closer to the surface 36 of the trunk 26 than the first end 28. In so doing, the first end 28 is able to interact with the crosswind to improve the aerodynamics of the vehicle 10 while the drag associated with the second end 32 caused by the forward movement of the vehicle 10 is minimized. It should be noted that in the context of a passenger side 34 crosswind (FIGS. 3C, 4C), the aerodynamic control module 14 would move the aerodynamic devices 12 in the opposite directions. As such, a detailed description of a passenger side 34 crosswind is foregone.

While not specifically illustrated, the aerodynamic control module 14 may be in communication with a motor associated with each of the aerodynamic devices 12 to cause the aerodynamic devices 12 to move relative to the vehicle body 42 in the manner described above. The motors may be electric motors and may be incrementally adjusted by the aerodynamic control module 14 based on the direction of the wind and the determined/detected velocity of the wind. Specifically, the motors may allow for movement of the aerodynamic devices 12 into a plurality of positions between a fully extended position and a fully retracted position.

Figure 5:
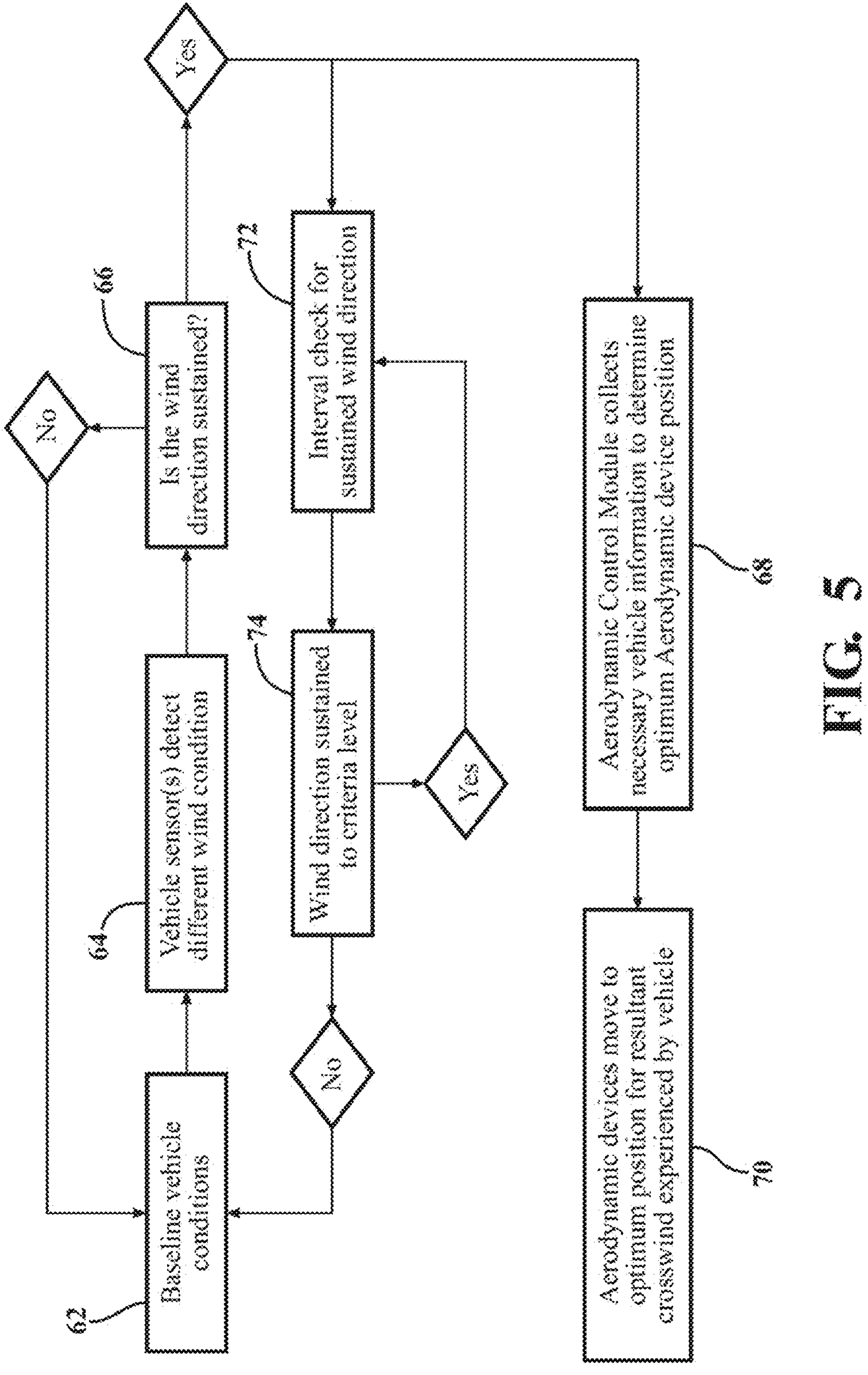
FIG. 5 is a flowchart of a system for controlling operation of the aerodynamic devices of FIG. 1 based on wind conditions experienced by the vehicle.

With particular reference to FIG. 5, a flowchart detailing operation of the aerodynamic control module 14 is provided. At 62, the aerodynamic control module 14 determines baseline conditions for the vehicle 10. If the sensors 54, 56 detect a change in wind conditions at 64, the aerodynamic control module 14 determines if the wind conditions are sustained for a predetermined period of time at 66. If the wind conditions are not sustained, the aerodynamic control module 14 returns to 62 to continue monitoring the current wind conditions around the vehicle 10.

If the aerodynamic control module 14 determines that the wind conditions are sustained at 66, the aerodynamic control module 14 collects information from the sensors 54, 56 as to the direction and severity of the current wind conditions at 68. The information from the sensors 54, 56 is used by the aerodynamic control module 14 to determine an optimum position for each aerodynamic device 12. For example, if the air around the vehicle 10 is determined to be a headwind and a slight crosswind from the passenger side 34, the aerodynamic control module 14 could keep all tire deflectors 18, 20, 22, 24 at least partially extended from the vehicle body 42 but would extend the tire deflectors 20, 24 associated with the passenger side 34 further than the tire deflectors 18, 22 associated with the driver side 30. Likewise, the aerodynamic control module 14 may extend the second end 32 of the spoiler 16 further from the surface 36 of the trunk 26 than the first end 28 but may still keep the first end 28 partially extended from the surface 36 due to the partial headwind experienced by the vehicle 10.

If the wind is sustained at 66, the aerodynamic control module 14 periodically checks to make sure that the wind direction is sustained at 72. If the wind direction is sustained at 74, the aerodynamic control module 14 continues to monitor the wind direction. If the wind direction is not sustained at 74, the aerodynamic control module 14 returns to 62 to begin the process again.

As described, the aerodynamic control module 14 utilizes sensor data from various sensors 54, 56 to determine a wind direction and severity. Based on at least the wind direction, the aerodynamic control module 14 may adjust a position of one or more aerodynamic devices 12 in an effort to optimize the aerodynamics of the vehicle 10. In so doing, the aerodynamic control module 14 optimizes the efficiency of the vehicle 10 during operation and continually adjusts the aerodynamic devices 12 based on current wind conditions such that vehicle efficiency is maximized.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

a first aerodynamic device extending from a body of the vehicle and movable between an extended position and a retracted position;

an on-vehicle sensor;

data processing hardware; and memory hardware in communication with the data processing hardware and storing instructions that, when executed on the data processing hardware, cause the data processing hardware to perform operations, the operations comprising an aerodynamic control module configured to:

determine, using the on-vehicle sensor, current wind conditions during forward movement of the vehicle, wherein the current wind conditions comprise a wind direction and a wind magnitude;

confirm, using remotely obtained weather data, the current wind conditions;

determine that the current wind conditions are sustained; and based on the current wind conditions being confirmed and sustained, move the first aerodynamic device between the extended position and the retracted position based on the current wind conditions.

2. The vehicle of claim 1, wherein the first aerodynamic device is a tire deflector.

3. The vehicle of claim 1, wherein the first aerodynamic device is a spoiler.

4. The vehicle of claim 1, further comprising a second aerodynamic device extending from the body of the vehicle and movable between an extended position and a retracted position.

5. The vehicle of claim 4, wherein the second aerodynamic device is operable between the extended position and the retracted position independent of the first aerodynamic device.

6. The vehicle of claim 5, wherein the aerodynamic control module is configured to move the second aerodynamic device between the extended position and the retracted position based on the current wind conditions.

7. The vehicle of claim 1, wherein the first aerodynamic device is movable into a plurality of positions relative to the body between the extended position and the retracted position.

8. A vehicle comprising:

a first tire deflector extending from a body of the vehicle proximate to a first tire located on a driver side of the vehicle and movable between an extended position and a retracted position;

a second tire deflector extending from the body of the vehicle proximate to a second tire located on a passenger side of the vehicle and movable between an extended position and a retracted position;

an on-vehicle sensor;

data processing hardware; and memory hardware in communication with the data processing hardware and storing instructions that, when executed on the data processing hardware, cause the data processing hardware to perform operations, the operations comprising an aerodynamic control module configured to:

determine, using the on-vehicle sensor, current wind conditions during forward movement of the vehicle, wherein the current wind conditions comprise a wind direction and a wind magnitude;

confirm, using remotely obtained weather data, the current wind conditions;

determine that the current wind conditions are sustained; and based on the current wind conditions being confirmed and sustained:

move the first tire deflector and the second tire deflector into the extended position during a headwind condition; and move one of the first tire deflector and the second tire deflector into the extended position and the other of the first tire deflector and the second tire deflector into the retracted position in a crosswind condition.

9. The vehicle of claim 8, wherein the on-vehicle sensor comprises at least one of a radar sensor or an ultrasonic sensor.

10. The vehicle of claim 8, wherein;

the on-vehicle sensor is in communication with the aerodynamic control module; and the aerodynamic control module is configured to differentiate between the headwind condition and the crosswind condition based on information received from the on-vehicle sensor.

11. The vehicle of claim 8, further comprising a spoiler extending from the body of the vehicle and including a first end and a second end.

12. The vehicle of claim 11, wherein the aerodynamic control module is configured to move the first end and the second end between a first position extending from a surface of the body and a second position adjacent to the surface of the body.

13. The vehicle of claim 12, wherein the aerodynamic control module is configured to move the first end and the second end independently from one another.

14. The vehicle of claim 12, wherein the aerodynamic control module is configured to move the first end and the second end between the first position and the second position based on the vehicle experiencing the headwind condition or the crosswind condition.

15. A system comprising:

data processing hardware; and memory hardware in communication with the data processing hardware and storing instructions that, when executed on the data processing hardware, cause the data processing hardware to perform operations, the operations comprising:

determining, using an on-vehicle sensor of a vehicle, current wind conditions during forward movement of the vehicle, wherein the current wind conditions comprise a wind direction and a wind magnitude;

confirming, using remotely obtained weather data, the current wind conditions;

determining that the current wind conditions are sustained; and based on the current wind conditions being confirmed and sustained, adjusting at least one aerodynamic device based on the current wind conditions.

16. The system of claim 15, wherein the at least one aerodynamic device includes a tire deflector.

17. The system of claim 16, wherein the at least one aerodynamic device includes a spoiler.

18. The system of claim 17, wherein the tire deflector and the spoiler are moved between an extended position extending from a body of the vehicle and a retracted position based on the current wind conditions.

19. A vehicle incorporating the system of claim 15.

* * * * *